(12) United States Patent
Heller et al.

(10) Patent No.: US 11,836,104 B2
(45) Date of Patent: Dec. 5, 2023

(54) SYSTEM AND METHOD FOR IDENTIFYING AND DISPLAYING A DETECTED FAULT IN A BUS

(71) Applicant: Eaton Intelligent Power Limited, Dublin (IE)

(72) Inventors: Franz Heller, Sankt Augustin (DE); Matthias Hansing, Bad Honnef (DE); Olaf Boecker, Alfter (DE)

(73) Assignee: EATON INTELLIGENT POWER LIMITED, Dublin (IE)

( * ) Notice: Subject to any disclaimer, the term of this patent is extended or adjusted under 35 U.S.C. 154(b) by 59 days.

(21) Appl. No.: 17/440,813

(22) PCT Filed: Mar. 17, 2020

(86) PCT No.: PCT/EP2020/057256
§ 371 (c)(1),
(2) Date: Feb. 9, 2022

(87) PCT Pub. No.: WO2020/187898
PCT Pub. Date: Sep. 24, 2020

(65) Prior Publication Data
US 2022/0188260 A1    Jun. 16, 2022

(30) Foreign Application Priority Data
Mar. 21, 2019  (DE) ..................... 10 2019 107 248.4

(51) Int. Cl.
*G06F 13/42*        (2006.01)
(52) U.S. Cl.
CPC .......... *G06F 13/42* (2013.01); *G06F 2213/40* (2013.01)

(58) Field of Classification Search
CPC .. G06F 13/42; G06F 13/4217; G06F 13/4221; G06F 13/4247; G06F 13/4252; G06F 2213/42; H04L 43/0817
See application file for complete search history.

(56) References Cited

U.S. PATENT DOCUMENTS

| | | | |
|---|---|---|---|
| 5,721,737 A | | 2/1998 | Radjabi et al. |
| 5,734,329 A | * | 3/1998 | Khosrowpour ......... H04L 25/49 710/110 |

(Continued)

FOREIGN PATENT DOCUMENTS

| | | |
|---|---|---|
| DE | 10316219 A1 | 11/2003 |
| DE | 102011006728 A1 | 10/2012 |

(Continued)

*Primary Examiner* — Raymond N Phan
(74) *Attorney, Agent, or Firm* — LEYDIG, VOIT & MAYER, LDT.

(57) ABSTRACT

A bus arrangement includes a coordinator, a first subscriber having a first optical display, a second subscriber having a second optical display, a third subscriber having a third optical display, and a bus that couples the coordinator to the first, second, and third subscribers. In a standard operating phase, the first subscriber is configured to display first local information of the first subscriber on the first optical display, the second subscriber is configured to display second local information of the second subscriber on the second optical display, and the third subscriber is configured to display third local information of the third subscriber on the third optical display. The coordinator is configured to switch from a standard operating phase to a display operating phase based on detecting a fault in the first subscriber.

13 Claims, 3 Drawing Sheets

(56) References Cited

U.S. PATENT DOCUMENTS

| | | | |
|---|---|---|---|
| 5,802,389 A | | 9/1998 | McNutt |
| 8,117,366 B2* | | 2/2012 | Bachhuber .............. H04L 41/12 |
| | | | 710/110 |
| 8,631,179 B1* | | 1/2014 | Faulds .................. G06F 13/364 |
| | | | 710/110 |
| 2002/0111948 A1 | | 8/2002 | Nixon et al. |
| 2005/0143863 A1 | | 6/2005 | Ruane et al. |
| 2010/0318702 A1* | | 12/2010 | Lohre .................. G05B 19/054 |
| | | | 710/105 |
| 2013/0166799 A1* | | 6/2013 | Godau ................... G06F 13/42 |
| | | | 710/107 |
| 2013/0250967 A1* | | 9/2013 | Premke .................. H04L 69/14 |
| | | | 370/431 |
| 2015/0134865 A1 | | 5/2015 | Godau et al. |
| 2016/0154693 A1 | | 6/2016 | Uhde et al. |
| 2017/0264456 A1* | | 9/2017 | Seidel .................... H05B 45/30 |
| 2019/0081806 A1 | | 3/2019 | Hansing et al. |
| 2019/0342115 A1* | | 11/2019 | Lieder ..................... H04L 12/40 |
| 2020/0136852 A1* | | 4/2020 | Bleiker .............. H04L 12/2816 |

FOREIGN PATENT DOCUMENTS

| | | |
|---|---|---|
| DE | 102012106601 A1 | 5/2014 |
| DE | 102013106954 A1 | 1/2015 |
| DE | 102016103928 A1 | 9/2017 |

* cited by examiner

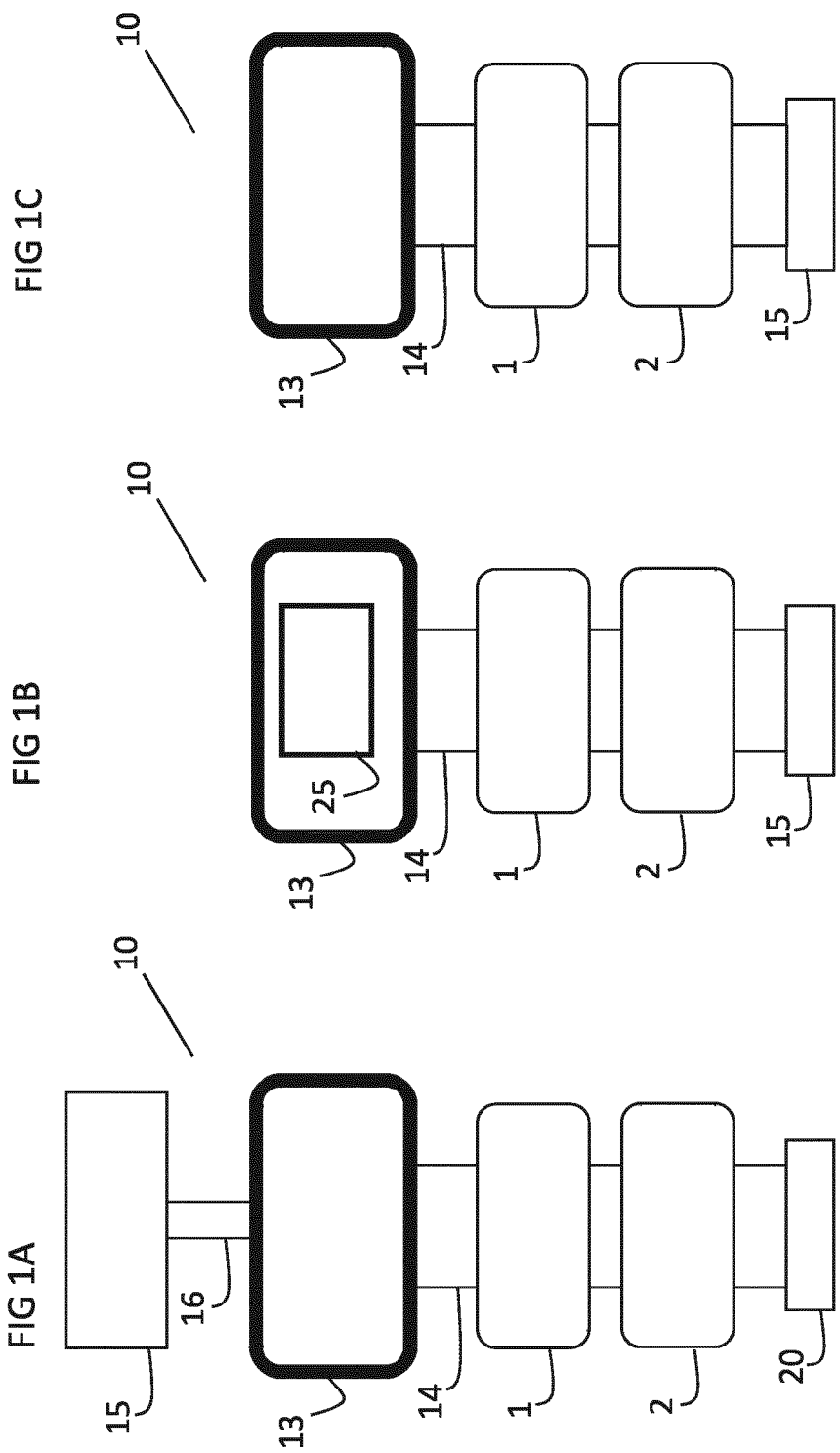

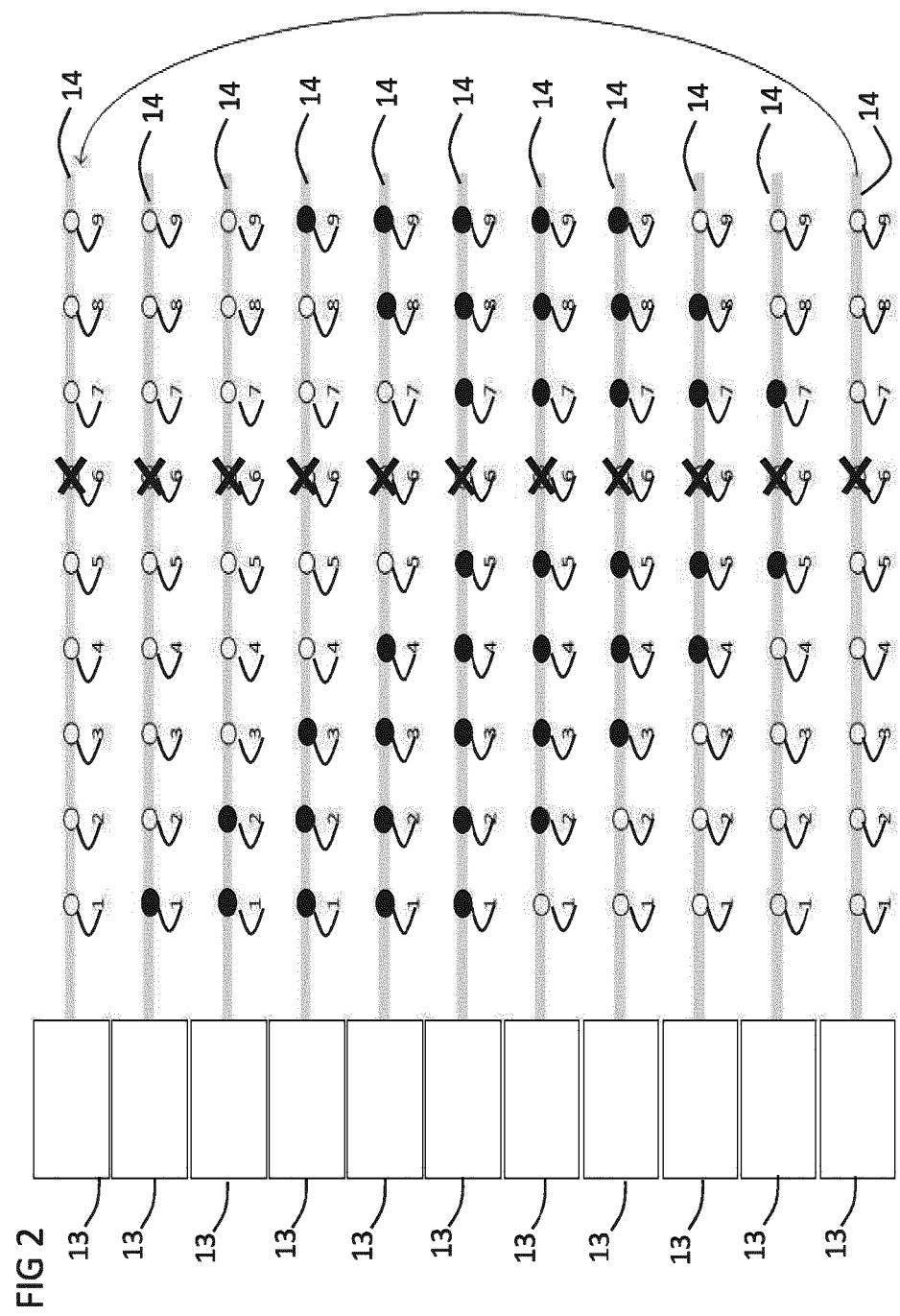

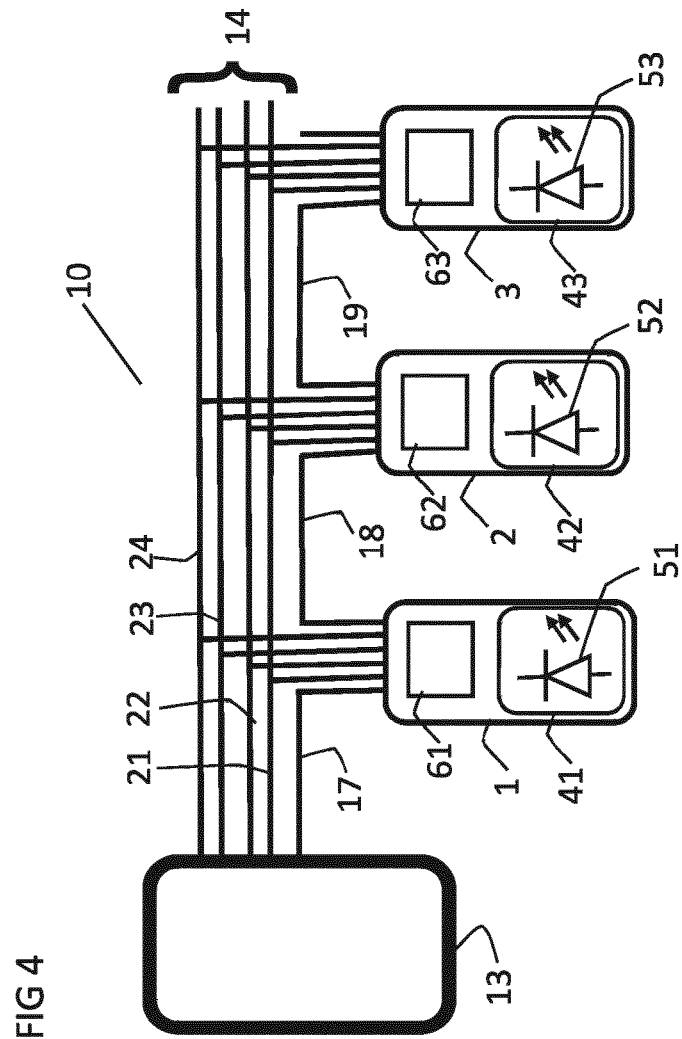
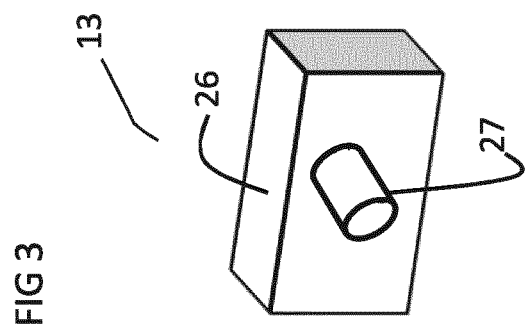

SYSTEM AND METHOD FOR IDENTIFYING AND DISPLAYING A DETECTED FAULT IN A BUS

CROSS-REFERENCE TO PRIOR APPLICATIONS

This application is a U.S. National Phase application under 35 U.S.C. § 371 of International Application No. PCT/EP2020/057256, filed on Mar. 17, 2020, and claims benefit to German Patent Application No. DE 10 2019 107 248.4, filed on Mar. 21, 2019. The International Application was published in German on Sep. 24, 2020 as WO 2020/187898 A1 under PCT Article 21(2).

FIELD

The present invention relates to a bus arrangement and to a method for operating a bus arrangement.

BACKGROUND

A bus arrangement can be used in automation technology. A bus arrangement typically has a coordinator and a plurality of subscribers. The subscribers can be implemented as actuators or sensors. The actuators can be switching devices such as contactors, motor starters and circuit breakers, command devices and frequency converters.

Document DE 103 16 219 A1 describes connected zones in a process control system containing geographically separate zones or locations that are connected communicatively via a satellite communication connection. The first zone, which is also referred to as a local zone and main zone, has a process control network containing two process controllers that are connected to an interzone server via a bus. The remote zone is also implemented as a process control zone. Alarm and event messages can be transferred between the zones. Alarm or event messages are transferred from the devices in the remote zone to a local zone device via the corresponding interzone server.

Document US 2005/0143863 A1 is concerned with a building control system. A field panel comprises a processor circuit, a data memory, an Ethernet communication circuit and a user interface having pushbuttons and a display. The Ethernet communication circuit emits signals and receives signals from a network bus. The user interface makes it possible for a user to obtain local access to building control data that is stored in a memory as well as access to data that is gathered by other field panels. The process circuit is designed to receive point values such as sensor values and to generate, for example, alarms therefrom. An alarm event can be stored locally or communicated to other nodes of the network.

Document DE 10 2013 106 954 A1 describes a method for fault monitoring. A control and data transmission system comprises two redundant control devices that are connected to process devices via a communication network. The control devices each comprise a fault memory for storing fault information in the form of fault lists and a display that is designed to display at least one fault list. To allow a holistic, redundancy-related diagnosis of the control and data transmission system, the control devices are designed to transmit pending fault information to the respective partner controller so that the fault information is available on both sides and can be displayed in a suitable manner.

SUMMARY

In an embodiment, the present invention provides a bus arrangement. The bus arrangement comprises: a coordinator, a first subscriber having a first optical display, a second subscriber having a second optical display, a third subscriber having a third optical display, and a bus that couples the coordinator to the first, second, and third subscribers, wherein in a standard operating phase, the first subscriber is configured to display first local information of the first subscriber on the first optical display, the second subscriber is configured to display second local information of the second subscriber on the second optical display, and the third subscriber is configured to display third local information of the third subscriber on the third optical display, wherein the coordinator is configured to: switch from the standard operating phase to a display operating phase based on detecting a fault in the first subscriber; and transmit second and third information to the second and third subscribers in such a way that the second optical display and the third optical display form a running light in the direction of the first subscriber.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIGS. 1A to 1C show examples of a bus arrangement;
FIG. 2 shows a further example of a bus arrangement at different points in time;
FIG. 3 shows an example of a coordinator; and
FIG. 4 shows a further example of a bus arrangement.

DETAILED DESCRIPTION

In an embodiment, the present invention provides a bus arrangement and a method for operating a bus arrangement in which the coordinator can display information.

In one embodiment, a bus arrangement comprises a coordinator, a first subscriber having a first optical display, a second subscriber having a second optical display, and a bus. The bus couples the coordinator to the first and second subscribers. The first subscriber is designed to display first local information of the first subscriber on the first optical display in a standard operating phase. The second subscriber is designed to display second local information of the second subscriber on the second optical display in the standard operating phase. In a display operating phase, the coordinator is designed to transmit first information to the first subscriber displaying the first information on the first optical display, and/or to transmit second information to the second subscriber displaying the second information on the second optical display.

The coordinator can advantageously use the optical displays of the subscribers in the display operating phase in order to display one or more pieces of information.

In one embodiment, the coordinator is free from an optical display. Thus, even a coordinator that cannot display any information itself is able to display the information or a plurality of pieces of information via the optical displays of the subscribers.

In an alternative embodiment, the coordinator comprises an optical display. Advantageously, a user becomes aware of the information when he stands in front of one of the subscribers.

In one embodiment, the coordinator switches from the standard operating phase to the display operating phase after having detected a fault in the second subscriber and then transmits the first information to the first subscriber. Alternatively, the coordinator switches from the standard operating phase to the display operating phase after having detected a fault in the first subscriber and transmits the second information to the second subscriber.

In one embodiment, the coordinator switches from the standard operating phase to the display operating phase in the event of a fault in the bus system.

In one embodiment, the bus arrangement comprises at least one further subscriber, in each case having a display. The coordinator switches from the standard operating phase to the display operating phase after having detected a fault in the at least one further subscriber and then transmits the information to the fault-free subscribers.

In one embodiment, the first local information is status information of the first subscriber and the second local information is status information of the second subscriber. Status information can be, for example, the information that the respective subscriber is connected to the bus, that its power supply is working and that it does not detect an internal fault.

In one embodiment, the first local information is provided by means of permanent emission of light by the first optical display. The second local information is displayed by means of permanent emission of light by the second optical display.

In one embodiment, the first information is displayed by means of intermittent emission of light by the first optical display and the second information is displayed by means of intermittent emission of light by the second optical display. In the case of intermittent emission of light, the respective optical display emits light pulses. The duration and the frequency of the light pulses can be selected so that they can be perceived by the human eye (and can be distinguished by the eye from permanent emission or a state without emission).

In one embodiment, the intermittent emission of light by the first optical display takes place as a function of the first information at different frequencies, with different duty cycles and/or with different patterns. A pattern can include, for example, long and short pulses (similar to Morse code). The optical display can thus emit light in the form of pulses at at least two frequencies. The same applies to the second optical display.

In one embodiment, the first optical display comprises a first number N of light-emitting diodes and the second optical display comprises a second number M of light-emitting diodes.

In one embodiment, the first number N and the second number M are equal to 1.

In one embodiment, the bus comprises electrical lines. The bus is a line-bound or wired bus.

Alternatively, the bus can be an optical bus.

Alternatively, the bus can be used in part as an optical bus and in part as a line-bound or wired bus.

In one embodiment, the bus comprises a first signal line that couples the first subscriber and the coordinator, a second signal line that connects the second subscriber to the first subscriber, and at least one bus line that connects the coordinator to the first and second subscribers.

In one embodiment, the bus arrangement comprises a third subscriber having a third optical display. The bus couples the coordinator to the third subscriber. In the standard operating phase, the third subscriber is designed to display third local information from the third subscriber on the third optical display.

In one embodiment, the bus comprises a third signal line that connects the third subscriber to the second subscriber. The at least one bus line connects the coordinator to the third subscriber.

In one embodiment, the coordinator switches from the standard operating phase to the display operating phase after having detected a fault in the third subscriber and transmits the first and second information to the first and second subscribers in such a way that the first optical display and the second optical display form a running light in the direction of the third subscriber.

In one embodiment, the coordinator switches from the standard operating phase to the display operating phase after having detected a fault in the first subscriber and transmits the second and third information to the second and third subscribers in such a way that the second optical display and the third optical display form a running light in the direction of the first subscriber.

In one embodiment, the bus arrangement comprises at least one further subscriber that is arranged between the coordinator and the first subscriber. In case of a fault in the first subscriber, the coordinator can generate a running light in the direction of the first subscriber and a running light from one end of the bus arrangement to the first subscriber.

In one embodiment, the first subscriber switches from the standard operating phase to the display operating phase after having detected a fault in the coordinator and/or the second subscriber and transmits the third information to the third subscriber. The first subscriber can, for example, also display the first information on the first optical display. Alternatively, another subscriber can also carry out these method steps.

In one embodiment, the coordinator is designed to activate the first subscriber in a configuration phase via the first signal line and to send a telegram containing a first subscriber address via the at least one bus line. The first subscriber is designed to store the first subscriber address.

In one embodiment, the first subscriber is designed to then activate the second subscriber via the second signal line in the configuration phase. The coordinator is designed to send a telegram containing a second subscriber address via the at least one bus line. The second subscriber is designed to store the second subscriber address.

In one embodiment, a method for operating a bus arrangement comprises the following: First local information of a first subscriber is displayed by a first optical display of the first subscriber in a standard operating phase, and second local information of a second subscriber is displayed by a second optical display of the second subscriber in the standard operating phase. Furthermore, first information is transmitted by a coordinator in a display operating phase to the first subscriber displaying the first information on the first optical display, and/or second information is transmitted by the coordinator in the display operating phase to the second subscriber displaying the second information on the second optical display.

A bus couples the coordinator to the first and second subscribers.

In one embodiment, the bus comprises a first signal line that couples the first subscriber and the coordinator, a second signal line that connects the second subscriber to the first subscriber, and at least one bus line that connects the coordinator to the first and second subscribers.

The method for operating a bus arrangement can be implemented, for example, by the bus arrangement according to one of the embodiments defined above and with the steps described above.

The method shows the use of optical signals in a bus arrangement. The bus arrangement can also be referred to as a bus system.

In one embodiment, the optical status display in a bus arrangement is typically controlled locally by the subscribers. If, however, a subscriber has no display, for example the coordinator, then it can use the control of the status display of its bus subscribers. This means that the bus subscribers also make their optical status display available to others. The bus arrangement can therefore, for example, also be able to use its status collectively. In one example, if a bus arrangement does not have any faults, the status light-emitting diodes (abbreviated status LEDs) of the individual subscribers are typically controlled and switched on locally. Atypically, faults that a coordinator detects in a network can be displayed in its own network, bus arrangement or system.

In one example, if the coordinator detects a faulty subscriber and this fault is possibly not displayed by the subscriber itself or cannot be displayed, this display will be taken over by the bus arrangement. The coordinator controls the status LEDs of the subscribers, for example as a running light, to indicate the subscriber concerned. The display of the system status LEDs would be used as a running light from left to right as well as from right to left. A directional running light can prove to be very helpful over longer bus distances. The fault itself, which is then still to be displayed, can then be displayed with a further combination.

Further alternatives for the signals shown by the status LEDs are, for example, varying frequency flashing, cyclic and acyclic flashing, pattern flashing, segment flashing etc. and a combination of these signals.

Segment flashing means that not all subscribers show these signals, but instead only a predefined number of subscribers upstream of the faulty subscriber and a number of subscribers downstream of the faulty subscriber.

In one embodiment, the bus arrangement can have a coordinator (also called a network coordinator) having a minimal user interface. The coordinator can be implemented more simply than a programmable logic controller that could display some status information. The bus arrangement therefore implements other means for displaying some status information (for example the failure of a participant), namely the transmission of information to the optical displays of the other subscribers.

In one embodiment, the coordinator is free of a status display (for example if the coordinator is not implemented as a combination with a programmable logic controller, abbreviated PLC, or with a gateway). The coordinator nevertheless displays a status, namely through intelligent control of other light-emitting diodes (abbreviated LEDs) in the network.

In one embodiment, the bus arrangement implements an intelligent status LED for diagnostic tasks. The coordinator does not have a diagnostic LED. All diagnoses are displayed to the user via the status LEDs in the subscribers. In one example there is a defective subscriber. The defective subscriber itself can have a dark status LED (i.e., status LED switched off) or a flashing status LED or an illuminated status LED (i.e., status LED switched on) (e.g., depending on the fault). To make it easier for a maintenance engineer to find the defective subscriber, the coordinator begins with messages to the subscribers, for example a running light from the beginning and end of the bus that points to the defective subscriber. The messages can be cyclic or acyclic messages. These messages can be made using acyclic data traffic; alternatively, messages are also possible in cyclic data traffic. Alternatively, the messages can also be communicated, for example, via the signal lines (also called select lines or SEL lines). Combinations of the messages would also be possible here. The messages do not have to be controlled by the coordinator alone; the subscribers also have the option of being able to use these messages in accordance with the above-mentioned embodiments.

FIG. 1A shows an example of a bus arrangement 10. The bus arrangement 10 comprises a coordinator 13, a first and a second subscriber 1, 2 and a bus 14, which couples the coordinator 13 to the first and the second subscribers 1, 2. In addition, the bus arrangement 10 comprises a termination circuit 20 that is attached to one end of the bus 14. The termination circuit 20 has, for example, resistors that connect the individual bus lines of the bus 14 to one another with high impedance. In addition, the bus arrangement 10 comprises a control system 15 that is coupled to the coordinator 13. The control system 15 can comprise a programmable logic controller, abbreviated to PLC. For example, a further bus 16 connects the control system 15 to the coordinator 13. The further bus 16 is implemented as a can bus, for example.

The coordinator 13 is designed to coordinate the bus 14 and the first and second subscribers 1, 2. The coordinator 13 can also be implemented as a gateway. The coordinator 13 is thus a component that establishes a connection between the further bus 16 and the bus 14. In this way, coordinator 13 processes data that it receives via further bus 16 before it forwards the data via bus 14. Conversely, the coordinator 13 processes data that it receives via the bus 14 before it outputs the data via the further bus 16. The coordinator 13 can also be implemented as a media converter, router, repeater, tap or switch.

FIG. 1B shows a further example of the bus arrangement 10, which is a further development of the example shown in FIG. 1A.

The bus system 10 is free from the control system 15. The bus system 10 can likewise be free from the further bus 16. The coordinator 13 can comprise a programmable logic controller 25, abbreviated PLC.

FIG. 1C shows a further example of the bus arrangement 10, which is a further development of the examples shown in FIGS. 1A and 1B. The coordinator 13 is free from the programmable logic controller 25. Optionally, the coordinator 13 has no external terminals apart from the terminals to the bus 14 and at least one power supply terminal. The coordinator 13 serves, for example, as a clock generator for the bus arrangement 10. FIGS. 1B and 1C show a bus arrangement 10 (also called a bus system) having an architecture of the coordinator 13 that is not connected to an overlying network (non-network) and, for example, also has no optical display.

The coordinator 13 performs the following functions during commissioning: Commissioning bus 14 and assigning an address to subscribers 1, 2, implementation of data acquisition for subscribers 1, 2.

The coordinator 13 has the following tasks during runtime: Controlling cyclic data traffic, controlling acyclic data traffic and replacing subscribers 1, 2 if one or more are "lost." Subscribers 1, 2 can be exchanged (the serial number of the exchanged and the new subscriber can be different). A subscriber 1, 2 can also be called a bus subscriber or device.

Subscribers 1, 2 have the following tasks during runtime: Communicate with other subscribers, run an internal program. Such a program can be loaded into the subscriber and started via the bus 14 (or also via a further communication interface of the subscriber), or the subscriber coordinates the program sequence automatically.

FIG. 2 shows an example of the bus arrangement 10, which is a further development of the examples shown in FIG. 1A to 1C. In FIG. 2, the bus arrangement 10 is shown at different points in time, namely at eleven points in time. The bus arrangement 10 comprises the coordinator 13 and a number L of subscribers 1-9. In the example shown in FIG. 2, the first number is L=9. The bus arrangement 10 thus comprises a first to a ninth subscriber 1-9. The coordinator 13 and the subscribers 1-9 form a daisy chain. The subscribers 1-9 are each connected to their respective predecessor. The bus 14 uses a series connection principle.

In the example in FIG. 2, it is assumed that the sixth subscriber 6 has a fault; for example, the sixth subscriber 6 can be defective, not connected to a power supply or completely absent, i.e., removed from the bus system 10. The fault in the sixth subscriber 6 is indicated by a cross in FIG. 2.

The subscribers 1-5, 7-9 have an optical display (see FIG. 4). The optical display can for example comprise a light-emitting diode. The number of light-emitting diodes per subscriber can be exactly 1, for example. In FIG. 2, a subscriber whose optical display does not indicate a signal is shown as a circle having a white area and a subscriber whose optical display is emitting a signal is shown as a circle or ellipse having a dark area.

The subscribers 1 to 5 between the coordinator 13 and the subscriber 6 having the fault control their respective optical display in such a way that a direction of movement of a signal from the coordinator 13 to the subscriber 6 having the fault is realized. The subscribers 7-9 between the end of the bus 14 and the subscriber 6 having the fault control their respective optical displays in such a way that a direction of travel of a signal is directed from the end of the bus 14 to the subscriber 6 having the fault.

The signals that have a running direction can advantageously indicate the location of the subscriber with the fault to a person. A running light is generated using the signals of the optical displays having a running direction.

In the first line, the bus arrangement 10 is shown at a first point in time at which all subscribers 1-5, 7-9 do not emit a signal on their respective optical display. In the second line, the bus arrangement 10 is shown at a second point in time, which is after the first point in time at which the first subscriber 1 emits a signal via its optical display. In the third line, the bus arrangement 10 in which the first and second subscribers 1, 2 emit a signal via their respective optical displays is indicated at a third point in time, which is after the second point in time. Correspondingly, at a fourth point in time, as shown in the fourth line, the third subscriber 3 is added, at a fifth point in time the fourth subscriber 4 is added, and at a sixth point in time the fifth subscriber 5 is added to the subscribers that emit a signal via their respective optical display.

Finally, at a seventh point in time, the first subscriber 1 does not emit a signal via its optical display. Subsequently, at an eighth point in time the second subscriber 2, at a ninth point in time the third subscriber 3, at a tenth point in time the fourth subscriber 4 and at an eleventh point in time also the fifth subscriber 5 do not emit a signal via the respective optical display. The seventh to the ninth subscribers 7-9 realize a running light accordingly. The process can then be repeated periodically or in response to a trigger signal.

Only one example is shown in FIG. 2. The subscriber 6 having a fault can also be another subscriber such as the first to the fifth or the seventh to the ninth subscribers 1-5, 7-9 or a further subscriber. In this way, troubleshooting in a bus arrangement 10 is advantageously facilitated.

FIG. 3 shows an example of the coordinator 13, which is a further development of the embodiments shown in FIGS. 1A to 1C and 2. The coordinator 13 has a housing 26, which can be implemented as a plastic housing, for example. The coordinator 13 has terminals 27 via which the bus 14 can be connected, for example by means of a plugging operation or a screwing operation. The coordinator 13 can be free of an optical display. The coordinator 13 can optionally have a switch. The switch can be used, for example, to trigger the start of a coordination phase.

FIG. 4 shows an example of the bus arrangement 10, which is a further development of the examples shown in the above figures. The first subscriber 1 has a first optical display 41. The first optical display comprises a first number N of light-emitting diodes 51. The first number N can be equal to 1, for example. The first subscriber 1 also has an application device 61.

The second subscriber 2 accordingly has a second optical display 42. The second optical display 42 comprises a second number M of light-emitting diodes 52. The second number M can also be 1. The second subscriber 2 also has an application device 62.

The third subscriber 3 accordingly has a third optical display 43. The third optical display 43 comprises a third number L of light-emitting diodes 53, which can be 1. The third subscriber 3 also has an application device 63. The light-emitting diodes 51-53 can also be referred to as status LEDs. At least one of the light-emitting diodes 51-53 can optionally be produced as a bicolor or multi-color LED.

The application device 61, 62, 63 can be implemented as an actuator, measuring device or sensor device. The first, second and third subscribers 1-3 can thus be implemented as an actuator, measuring device and/or sensor. The actuator can be implemented, for example, as a switching device such as a contactor, a motor starter and a circuit breaker, command device and/or frequency converter.

The bus 14 comprises a first signal line 17 that connects a terminal of the coordinator 13 to a terminal of the first subscriber 1. The first signal line 17 is not directly connected to the second subscriber 2 or another subscriber 3-9. The bus 14 further comprises a second signal line 18 that connects a terminal of the first subscriber 1 to a terminal of the second subscriber 2. In addition, the bus 14 comprises a third signal line 19 that connects a terminal of the second subscriber 2 to a terminal of the third subscriber 3. In addition, the bus 14 comprises at least one bus line 21 that connects the coordinator 13 to the subscribers and thus to the first, second and third subscribers 1-3. A signal on the at least one bus line 21 reaches the subscribers 1-3. The bus 14 can comprise a further bus line 22 that connects the coordinator 13 to the subscribers 1-3. The at least one bus line 21 and the further bus line 22 can also be referred to as the first and second bus lines.

In addition, the bus 14 can comprise, for example, a supply line 23 that connects a power supply of the coordinator 13 to a power supply of the first subscriber 1, to a power supply of the second subscriber 2, and to a power supply of the third subscriber 3. The power supply can be implemented as a voltage regulator. Furthermore, the bus 14 can comprise, for example, a reference potential line 24 that connects a reference potential terminal of the coordinator 13 to reference potential terminals of the subscribers 1-3.

The coordinator 13 supplies the subscribers 1-3 with electrical energy via the supply line 23 and the reference potential line 24.

The bus 14 is implemented as a linear bus. The bus 14 can be designed as a serial bus. The coordinator 13 can be implemented as a master. The subscribers 1-3 can be implemented as slaves. The bus 14 is not implemented as a ring-shaped bus, for example. The coordinator 13 and the subscribers 1-3 form a chain. The first to third signal lines 17, 18, 19 form a daisy chain. The bus line 21 and the further bus line 22 can be, for example, an RS 485 bus line/data line. The bus 14 is implemented as a ribbon cable or a round cable. According to FIG. 4, the bus 14 can consist of five strands, for example. Alternatively, the bus 14 can have a different number of strands, for example two to four strands or six to eight strands.

The coordinator 13 comprises, for example, a processor core that is connected to the first signal line 17. The processor core can be implemented as a microprocessor. The first subscriber 1 comprises a processor core that is connected to the first and second signal lines 17, 18. The second subscriber 2 also includes a processor core that is connected to the second and third signal lines 18, 19. The third subscriber 3 likewise comprises a processor core that is connected to the third signal line 19 and any further signal line. The respective processor cores can be implemented as microprocessors.

The bus line 21 and the further bus line 22 as well as the coordinator 13 and the subscribers 1-3 can be implemented according to the TIA/EIA-485 A standard.

A switch-off phase is followed, for example, by an operating phase. The operating phase begins with a configuration phase. The coordinator 13 has an address, for example 0. No subscriber addresses are stored in the first to the third subscribers 1-3. The coordinator 13 successively assigns 1-3 subscriber addresses to the participants using the signal lines 17, 18, 19. The geographical positions and thus the order of the subscribers 1-3 on the bus 14 are thus determined.

The coordinator 13 activates the first subscriber 1 via the first signal line 17. After activation, the coordinator 13 sends a telegram containing a first subscriber address to all subscribers 1-3 via the bus line 21 and the further bus line 22. Only the activated subscriber, namely the first subscriber 1, stores the first subscriber address contained in the telegram in its volatile memory. The first subscriber address can be 1. The first geographical subscriber 1 thus also takes over the subscriber address number 1 in addition to the coordinator 13. From this point in time, this subscriber 1 then accepts all messages that are directed to subscriber address 1.

In a further step of the configuration phase, the coordinator 13 sends a telegram to the first subscriber 1 with the command to activate the output signal line, i.e., the second signal line 18. The first subscriber 11 activates the second subscriber 2 via a signal on the second signal line 18. Then, the coordinator 13 sends a telegram to all subscribers 1-3, which contains the second subscriber address, for example 2. Because only the second subscriber 2 is activated, only the second subscriber 2 stores the second subscriber address in its volatile memory. The coordinator 13 continues this method until all detectable subscribers have been assigned a subscriber address. Consequently, the third subscriber 3 is activated and a third subscriber address, such as 3, is assigned thereto.

In the operating phase, after the configuration phase has been completed, the coordinator 13 is now able to address all subscribers 1-3 via the subscriber addresses.

Subscribers may fail during the operating phase. In the example shown in FIG. 2, the sixth subscriber 6 may have failed. The coordinator 13 is also able to send telegrams to subscribers 1-5 and 7-9 that have not failed via the bus line 21 and the further bus line 22 and control the subscribers 11, 62 that have not failed or query their data. The bus arrangement 10 continues to run even after the failure of one or more subscribers 6. Thus, in the display operating phase, the coordinator 13 can transmit first information to the first subscriber 1 displaying the first information on the first optical display 41. Furthermore, the coordinator can transmit second information to the second subscriber 2, which displays the second information on the second optical display 42. The faulty subscriber 6 can be indicated by the running light.

When the bus arrangement 10 (also called a system) is put into operation, the subscribers 1-3 are successively addressed by the coordinator 13 in an ascending address sequence. This method ends before the first missing subscriber or at the last possible subscriber to be addressed. The geographical position of the bus subscribers 1-3 is ensured via a select line. Details of the subscribers 1-3 can be a device ID such as vendor, device, version, etc. Such information is read out by each subscriber 1-3 and stored in the coordinator 13 in a non-volatile manner. Using this method, subscribers 1-3, but also subscriber segments, can be switched on and off individually and can also be exchanged in an operating mode provided for this purpose. The coordinator 13 has the task of coordinating the cyclic and acyclic data transport.

If the bus arrangement 10 has no faults whatsoever, the subscribers can communicate this in that all the status LEDs 51-53 are switched on (for example, they continuously emit light). If the coordinator detects a fault in a subscriber, for example because said subscriber no longer responds to a communication on the bus, then the coordinator 13 uses the light-emitting diodes 51-53 of the subscribers 1-3 (or the other subscribers) sporadically or at manageable intervals in the system to visually draw the user's attention to the fault. To do this, it uses the status LEDs 51-53 of its subscribers 1-3 as a display. In the case of larger bus distances, the user now has the opportunity to better orientate himself towards this affected fault location.

Alternatively, the bus arrangement 10 comprises fewer than three subscribers or more than three subscribers.

In an alternative embodiment, the bus 14 is implemented without the signal lines 17-19.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

List of Reference Signs 1-9 subscribers
10 bus arrangement
13 coordinator
14 bus
15 control system
16 further bus
17-19 signal line
20 termination circuit
21 at least one bus line
22 further bus line
23 supply line
24 reference potential line
25 programmable logic controller
26 housing
27 terminals
41-43 optical display
51-53 light-emitting diode
61-63 application device

The invention claimed is:

1. A bus arrangement, comprising:
a coordinator,
a first subscriber having a first optical display,
a second subscriber having a second optical display,
a third subscriber having a third optical display, and
a bus that couples the coordinator to the first, second, and third subscribers,
wherein in a standard operating phase, the first subscriber is configured to display first local information of the first subscriber on the first optical display, the second subscriber is configured to display second local information of the second subscriber on the second optical display, and the third subscriber is configured to display third local information of the third subscriber on the third optical display,
wherein the coordinator is configured to:
switch from the standard operating phase to a display operating phase based on detecting a fault in the first subscriber; and
transmit second and third information to the second and third subscribers in such a way that the second optical display and the third optical display form a running light in the direction of the first subscriber.

2. The bus arrangement according to claim 1, wherein the first local information is status information of the first subscriber and the second local information is status information of the second subscriber.

3. The bus arrangement according to claim 1, wherein the first local information is displayed by means of permanent emission of light by the first optical display and the second local information is displayed by means of permanent emission of light by the second optical display.

4. The bus arrangement according to claim 1, wherein the first information is displayed by means of intermittent emission of light by the first optical display and the second information is displayed by means of intermittent emission of light by the second optical display.

5. The bus arrangement according to claim 1, wherein the first optical display comprises a first number N of light-emitting diodes and the second optical display comprises a second number M of light-emitting diodes.

6. The bus arrangement according to claim 1, wherein the bus comprises:
a first signal line that couples the first subscriber and the coordinator,
a second signal line that connects the second subscriber to the first subscriber, and
at least one bus line that connects the coordinator to the first and second subscribers.

7. The bus arrangement according to claim 1, wherein the running light starts from a first end of the bus in the direction of the first subscriber.

8. The bus arrangement according to claim 4, wherein the intermittent emission of light by the first optical display takes place as a function of the first information at different frequencies, with different duty cycles and/or with different patterns.

9. The bus arrangement according to claim 5, wherein the first number N and the second number M are equal to 1.

10. The bus arrangement according to claim 6, wherein the coordinator is configured to activate the first subscriber in a configuration phase via the first signal line and to send a telegram comprising a first subscriber address via the at least one bus line, and wherein the first subscriber is configured to store the first subscriber address.

11. The bus arrangement according to claim 7, wherein the running light starts from a second end of the bus in the direction of the first subscriber.

12. The bus arrangement according to claim 11, wherein the running light starts from the first end of the bus and the second end of bus simultaneously.

13. A method for operating a bus arrangement, comprising:
displaying first local information of a first subscriber by a first optical display of the first subscriber in a standard operating phase,
displaying second local information of a second subscriber by a second optical display of the second subscriber in the standard operating phase,
displaying third local information of a third subscriber on a third optical display of the third subscriber in the standard operating phase, wherein a bus couples a coordinator to the first, second and third subscriber,
switching, by the coordinator, from the standard operating phase to a display operating phase based on detecting a fault in the first subscriber, and
transmitting, by the coordinator, second and third information to the second and third subscribers in the display operating phase in such a way that the second optical display and the third optical display form a running light in the direction of the first subscriber.

\* \* \* \* \*